United States Patent
Mignogna et al.

(10) Patent No.: US 11,873,365 B2
(45) Date of Patent: Jan. 16, 2024

(54) CATATLYST COMPONENTS FOR THE POLYMERIZATION OF OLEFINS

(71) Applicant: BASELL POLIOLEFINE ITALIA S.R.L., Milan (IT)

(72) Inventors: Alessandro Mignogna, Ferrara (IT); Dario Liguori, Ferrara (IT); Giampiero Morini, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 35 days.

(21) Appl. No.: 17/620,968

(22) PCT Filed: Jun. 24, 2020

(86) PCT No.: PCT/EP2020/067640
§ 371 (c)(1),
(2) Date: Dec. 20, 2021

(87) PCT Pub. No.: WO2021/001232
PCT Pub. Date: Jan. 7, 2021

(65) Prior Publication Data
US 2022/0332856 A1    Oct. 20, 2022

(30) Foreign Application Priority Data
Jul. 3, 2019 (EP) ..................... 19184162

(51) Int. Cl.
C08F 4/642 (2006.01)
C08F 10/06 (2006.01)

(52) U.S. Cl.
CPC ............ C08F 4/6421 (2013.01); C08F 10/06 (2013.01)

(58) Field of Classification Search
CPC ................ C08F 4/6421; C08F 10/06
See application file for complete search history.

(56) References Cited

U.S. PATENT DOCUMENTS

| 2008/0125614 A1* | 5/2008 | Uhrhammer ............ C08F 10/00 585/527 |
| 2018/0057621 A1 | 3/2018 | Mignogna et al. |
| 2018/0057622 A1 | 3/2018 | Mignogna et al. |

FOREIGN PATENT DOCUMENTS

| CN | 107580607 A | 1/2018 |
| CN | 109890852 A | 6/2019 |
| RU | 2630228 C1 | 9/2017 |
| WO | 2006110234 A2 | 10/2006 |
| WO | 2017093132 A1 | 6/2017 |
| WO | 2018091375 A1 | 5/2018 |

OTHER PUBLICATIONS

International Search Report and Written Opinion dated Sep. 17, 2020 (dated Sep. 17, 2020) For Corresponding PCT/EP2020/067640.

* cited by examiner

*Primary Examiner* — Catherine S Branch

(57) ABSTRACT

A solid catalyst component for the polymerization of olefins made from or containing Mg, Ti and an electron donor of formula (I)

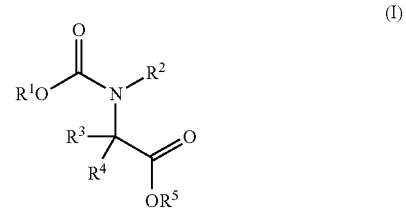

where the $R^1$ and $R^5$ groups, equal to or different from each other, are selected from $C_1$-$C_{15}$ hydrocarbon groups, $R^2$ group is selected from $C_2$-$C_{10}$ hydrocarbon groups, $R^3$ to $R^4$ groups, independently, are selected from hydrogen or $C_1$-$C_{20}$ hydrocarbon groups, optionally fused together to form one or more cycles, with the proviso that at least one of $R^3$ to $R^4$ groups is a $C_1$-$C_{20}$ alkyl group.

12 Claims, No Drawings

CATATLYST COMPONENTS FOR THE POLYMERIZATION OF OLEFINS

This application is the U.S. National Phase of PCT International Application PCT/EP2020/067640, filed Jun. 24, 2020, claiming benefit of priority to European Patent Application No. 19184162.6, filed Jul. 3, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to catalyst components for the polymerization of olefins made from or containing a Mg dihalide based support on which are supported Ti atoms and an electron donor compound containing an ester and a carbamate functional group.

BACKGROUND OF THE INVENTION

In some instances, catalyst components are used for the stereospecific polymerization of olefins. Concerning the polymerization of propylene, Ziegler-Natta catalysts are used which are made from or containing a solid catalyst component, constituted by a magnesium dihalide on which are supported a titanium compound and an internal electron donor compound, used in combination with an Al-alkyl compound. In some instances, an external donor is used to obtain higher crystallinity and higher isotacticity of the polymer. In some instances, esters of phthalic acid are used as internal donors in catalyst preparations. In some instances, phthalates are used as internal donors in combination with alkylalkoxysilanes as external donor.

SUMMARY OF THE INVENTION

In a general embodiment, the present disclosure provides a catalyst component for the polymerization of olefins made from or containing Mg, Ti and an electron donor of formula (I)

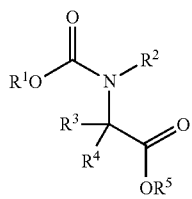

where the $R^1$ and $R^5$ groups, equal to or different from each other, are selected from $C_1$-$C_{15}$ hydrocarbon groups, $R^2$ group is selected from $C_2$-$C_{10}$ hydrocarbon groups, $R^3$ to $R^4$ groups, independently, are selected from hydrogen or $C_1$-$C_{20}$ hydrocarbon groups, optionally fused together to form one or more cycles, with the proviso that at least one of $R^3$ to $R^4$ groups is a $C_1$-$C_{20}$ alkyl group.

DETAILED DESCRIPTION OF THE INVENTION

In some embodiments and as used herein, the term "hydrocarbon group" refers to carbon and hydrogen in groups $R^1$ to $R^5$. In some embodiments, the hydrocarbon group is further made from or containing a heteroatom selected from halogen, P, S, N, O and Si.

In some embodiments and as used herein, the term "alkyl group" also refers to arylalkyl groups with the same carbon atom range deriving from alkyl groups by replacement of a hydrogen atom with an aryl group.

In some embodiments, $R^1$ is a $C_1$-$C_{10}$ alkyl group or arylalkyl group, alternatively a $C_1$-$C_8$ alkyl group. In some embodiments, the alkyl group is a primary alkyl group.

In some embodiments, $R^2$ is selected from $C_2$-$C_{10}$ alkyl or $C_7$-$C_{10}$ arylalkyl groups, alternatively from $C_3$-$C_{10}$ alkyl groups or $C_7$-$C_{10}$ arylalkyl groups, alternatively from $C_3$-$C_{10}$ primary alkyl or primary $C_7$-$C_{10}$ arylalkyl groups.

In some embodiments, $R^3$ is selected from branched $C_3$-$C_{15}$ alkyl or arylalkyl groups, alternatively a $C_4$-$C_{10}$ branched alkyl or arylalkyl groups, alternatively from primary branched $C_4$-$C_{10}$ branched alkyl or arylalkyl groups.

In some embodiments, $R^4$ is hydrogen or a $C_1$-$C_{15}$ alkyl group, alternatively hydrogen.

In some embodiments, $R^3$ is selected from branched $C_3$-$C_{15}$ alkyl or arylalkyl group and $R^4$ is hydrogen.

In some embodiments, $R^5$ is a $C_1$-$C_{10}$ alkyl group, alternatively a $C_1$-$C_8$ alkyl group. In some embodiments, the alkyl group is a primary alkyl group.

In some embodiments, $R^1$ and $R^5$ are independently a $C_1$-$C_{10}$ alkyl group, $R^2$ is selected from $C_2$-$C_{10}$ alkyl or $C_7$-$C_{10}$ arylalkyl groups, $R^3$ is selected from branched $C_3$-$C_{15}$ alkyl or arylalkyl groups, and $R^4$ is hydrogen.

In some embodiments, the final amount of electron donor compound in the solid catalyst component ranges from 1 to 25% by weight, alternatively from 3 to 20% by weight.

In some embodiments, the electron donor of formula (I) is selected from the group consisting of
ethyl N-(ethoxycarbonyl)-N-propylphenylalaninate, ethyl N-(ethoxycarbonyl)-N-isopropylphenylalaninate, ethyl N-(ethoxycarbonyl)-N-ethylphenylalaninate, ethyl N-(ethoxycarbonyl)-N-hexylphenylalaninate, ethyl N-decyl-N-(ethoxycarbonyl)phenylalaninate, ethyl N-(ethoxycarbonyl)-N-isobutylphenylalaninate, ethyl N-butyl-N-(ethoxycarbonyl)phenylalaninate, ethyl N-(ethoxycarbonyl)-N-isopropylleucinate, ethyl N-(ethoxycarbonyl)-N-propylleucinate, ethyl N-(ethoxycarbonyl)-N-ethylleucinate, ethyl N-(ethoxycarbonyl)-N-isobutylleucinate, ethyl N-butyl-N-(ethoxycarbonyl)leucinate, ethyl N-(ethoxycarbonyl)-N-hexylleucinate, ethyl N-decyl-N-(ethoxycarbonyl)leucinate, ethyl N-(ethoxycarbonyl)-N-propylvalinate, ethyl N-(ethoxycarbonyl)-N-ethylvalinate, ethyl N-(ethoxycarbonyl)-N-isobutylvalinate, ethyl N-butyl-N-(ethoxycarbonyl)valinate, ethyl N-(ethoxycarbonyl)-N-hexylvalinate, ethyl N-decyl-N-(ethoxycarbonyl) valinate, ethyl 2-((ethoxycarbonyl)(ethyl)amino)hexanoate, ethyl 2-((ethoxycarbonyl)(propyl)amino)hexanoate, ethyl 2-(butyl(ethoxycarbonyl)amino)hexanoate, ethyl 2-((ethoxycarbonyl)(isobutyl)amino)hexanoate, ethyl 2-(decyl(ethoxycarbonyl)amino)hexanoate, ethyl 2-((ethoxycarbonyl)(hexyl)amino)hexanoate, ethyl 2-((ethoxycarbonyl)(isopropyl)amino)hexanoate, ethyl 2-((ethoxycarbonyl)(propyl)amino)-3-methylpentanoate, ethyl N-(ethoxycarbonyl)-N-isopropylvalinate, ethyl 2-((ethoxycarbonyl)(ethyl)amino)-3-methylpentanoate, ethyl 2-((ethoxycarbonyl)(isobutyl)amino)-3-methylpentanoate, ethyl 2-(butyl(ethoxycarbonyl)amino)-3-methylpentanoate, ethyl 2-((ethoxycarbonyl)(hexyl)amino)-3-methylpentanoate, ethyl 2-(decyl(ethoxycarbonyl)amino)-3-methylpentanoate, ethyl N-(ethoxycarbonyl)-N-isopropylalaninate, ethyl N-(ethoxycarbonyl)-N-propylalaninate, ethyl N-(ethoxycarbonyl)-N- ethylalaninate, ethyl N-(ethoxycarbonyl)-N-isobutylalaninate, ethyl 2-(butyl(ethoxycarbonyl)amino)butanoate, ethyl N-(ethoxycarbonyl)-N-hexylalaninate, ethyl N-decyl-N-(ethoxycarbonyl)alaninate, ethyl 2-((ethoxycarbonyl)(propyl)amino)-3-(p-tolyl)propanoate, ethyl 2-((ethoxycarbonyl)(isobutyl)amino)-3-(o-tolyl)propanoate, ethyl 2-(decyl(ethoxycarbonyl)amino)-3-mesitylpropanoate, ethyl 2-(butyl(ethoxycarbonyl)amino)-3-(naphthalen-2-yl)propanoate, ethyl 3-(4-chlorophenyl)-2-((ethoxycarbonyl)(ethyl)amino)propanoateethyl 3-(3,4-dimethylphenyl)-2-((ethoxycarbonyl)(hexyl)amino)propanoate, methyl 2-((ethoxycarbonyl)(isobutyl)amino)-3-phenylbutanoate, isobutyl 2-(butyl(ethoxycarbonyl)amino)-4-phenylbutanoate, ethyl 2-(isobutyl(methoxycarbonyl)amino)-3-methylpentanoate, methyl 2-(ethyl(methoxycarbonyl)amino)-3-methylpentanoate, ethyl N-hexyl-N-(propoxycarbonyl)valinate, ethyl N-hexyl-N-(propoxycarbonyl)valinate, butyl 2-((ethoxycarbonyl)(hexyl)amino)hexanoate, isobutyl 2-((butoxycarbonyl)(decyl)amino)-5-methylhexanoate, ethyl 1-(butyl(ethoxycarbonyl)amino)cyclohexane-1-carboxylate, ethyl 1-((ethoxycarbonyl)(isobutyl)amino)cyclopentane-1-carboxylate, ethyl 2-((ethoxycarbonyl)(isobutyl)amino)-2-ethylbutanoate, ethyl 2-((ethoxycarbonyl)(ethyl)amino)-2-isobutyl-4-methylpentanoate, and ethyl 2-((ethoxycarbonyl)(hexyl)amino)-2-methylpropanoate In some embodiments, the electron donor of formula (I) is prepared by using the following synthetic route.

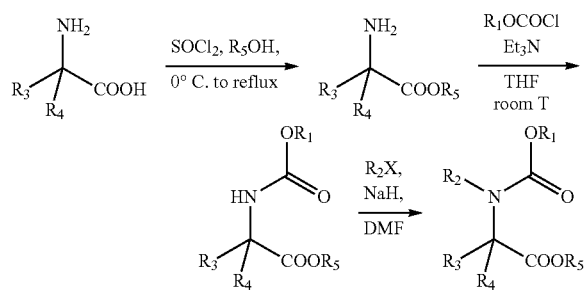

In some embodiments and in the solid catalyst component, the amount of Ti atoms is higher than 2% wt, alternatively higher than 2.50%, with respect to the total weight of the catalyst component.

In some embodiments, the catalyst components are made from or containing the above-described electron donors, Ti, Mg and halogen. In some embodiments, the catalyst components are made from or containing a titanium compound, having at least a Ti-halogen bond and the electron donor compounds supported on a Mg halide. In some embodiments, the magnesium halide is $MgCl_2$ in active form.

In some embodiments, the titanium compounds are selected from the group consisting of $TiCl_4$, $TiCl_3$, and Ti-haloalcoholates of formula $Ti(OR^6)_{m-y}X_y$, wherein m is the valence of titanium, y is a number between 1 and m−1, X is halogen and $R^6$ is a hydrocarbon radical having from 1 to 10 carbon atoms.

In some embodiments, the solid catalyst component is prepared by the reaction between magnesium alcoholates or chloroalcoholates and an excess of $TiCl_4$ in the presence of the electron donor compounds at a temperature of about 80 to 120° C. In some embodiments, the chloroalcoholates are prepared as described in U.S. Pat. No. 4,220,554.

In some embodiments, the solid catalyst component is prepared by reacting a titanium compound of formula $Ti(OR^7)_{m-y}X_y$, where m is the valence of titanium and y is a number between 1 and m, with a magnesium chloride deriving from an adduct of formula $MgCl_2 \cdot pR^8OH$, where p is a number between 0.1 and 6, alternatively from 2 to 3.5, and $R^8$ is a hydrocarbon radical having 1-18 carbon atoms. In some embodiments, the titanium compound is $TiCl_4$. In some embodiments, the adduct is prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the procedure for the preparation of the spherical adducts are as disclosed in U.S. Pat. Nos. 4,399,054 and 4,469,648. In some embodiments, the adduct is directly reacted with Ti compound or subjected to thermal controlled dealcoholation (80-130° C.), thereby obtaining an adduct in which the number of moles of alcohol is lower than 3, alternatively between 0.1 and 2.5. In some embodiments, the reaction with the Ti compound is carried out by suspending the adduct (dealcoholated or as such) in cold $TiCl_4$ (about 0° C.); the mixture is heated up to 80-130° C. and kept at this temperature for 0.5-2 hours. In some embodiments, the treatment with $TiCl_4$ is carried out one or more times. In some embodiments, the electron donor compound is added during the treatment with $TiCl_4$. In some embodiments, the preparation of catalyst components in spherical form occurs as described in European Patent Applications EP-A-395083, EP-A-553805, EP-A-553806, EP-A-601525, or Patent Cooperation Treaty Publication No. WO98/44009.

In some embodiments, the solid catalyst components show a surface area (by B.E.T. method) between 20 and 500 $m^2/g$, alternatively between 50 and 400 $m^2/g$, and a total porosity (by B.E.T. method) higher than 0.2 $cm^3/g$, alternatively between 0.2 and 0.6 $cm^3/g$. In some embodiments, the porosity (Hg method) due to pores with radius up to 10.000 Å ranges from 0.3 to 1.5 $cm^3/g$, alternatively from 0.45 to 1 $cm^3/g$.

The solid catalyst component has an average particle size ranging from 5 to 120 μm and alternatively from 10 to 100 μm.

In some embodiments, the electron donor compounds are added as such or obtained in situ by using a precursor.

In some embodiments, the final amount of the electron donor compound of formula (I) provides a molar ratio with respect to the Ti atoms from 0.01:1 to 2:1, alternatively from 0.05:1 to 1.5:1. In some embodiments, the solid catalyst components are converted into catalysts for the polymerization of olefins by reacting the solid catalyst components with organoaluminum compounds.

In some embodiments, the present disclosure provides a catalyst for the polymerization of olefins $CH_2$=CHR, wherein R is hydrogen or a hydrocarbyl radical with 1-12 carbon atoms, made from or containing the product obtained by contacting:
(i) the solid catalyst component and
(ii) an alkylaluminum compound and optionally,
(iii) an external electron donor compound.

In some embodiments, the alkyl-Al compound (ii) is a trialkyl aluminum compound. In some embodiments, the trialkyl aluminum compound is selected from the group consisting of triethylaluminum, triisobutylaluminum, tri-n-butylaluminum, tri-n-hexylaluminum, and tri-n-octylaluminum. In some embodiments, the alkyl-Al compound (ii) is selected from alkylaluminum halides, alkylaluminum hydrides, alkylaluminum sesquichlorides, or mixtures with trialkylaluminums. In some embodiments, the alkylaluminum sesquichlorides is $AlEt_2Cl$ or $Al_2Et_3Cl_3$.

In some embodiments, the external electron-donor compounds are selected from the group consisting of silicon compounds, ethers, esters, amines, and heterocyclic compounds.

In some embodiments, the external donor compounds are silicon compounds of formula $(R^9)_a(R^{10})_b Si(OR^{11})_c$, where a and b are integers from 0 to 2, c is an integer from 1 to 4 and the sum (a+b+c) is 4; $R^9$, $R^{10}$, and $R^{11}$, are radicals with 1-18 carbon atoms optionally containing heteroatoms. In some embodiments, the external donor compounds are silicon compounds wherein a is 1, b is 1, c is 2, at least one of $R^7$ and $R^8$ is selected from branched alkyl, cycloalkyl or aryl groups with 3-10 carbon atoms optionally containing heteroatoms and $R^9$ is a $C_1$-$C_{10}$ alkyl group. In some embodiments, $R_9$ is methyl. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), diisopropyldimethoxysilane, (2-ethylpiperidinyl)t-butyldimethoxysilane, ethylpiperidinyl)thexyldimethoxysilane, (3,3,3-trifluoro-n-propyl)(2-ethylpiperidinyl)dimethoxysilane, methyl(3,3,3-trifluoro-n-propyl)dimethoxysilane, and N,N-diethylaminotriethoxysilane. In some embodiments, the external donor compounds are silicon compounds wherein a is 0, c is 3, $R^8$ is a branched alkyl or cycloalkyl group, optionally containing heteroatoms, and $R^9$ is methyl. In some embodiments, the silicon compounds are selected from the group consisting of cyclohexyltrimethoxysilane, t-butyltrimethoxysilane and thexyltrimethoxysilane.

In some embodiments, the amount of electron donor compound (iii) provides a molar ratio between the organoaluminum compound and the electron donor compound (iii) of from 0.1 to 500, alternatively from 1 to 300, alternatively from 3 to 100.

In some embodiments, the catalyst components are used to produce polypropylene with a polymerization activity higher than 35 Kgpol/gcat, alternatively higher than 40 Kgpol/gcat, and a xylene insolubility at 25° C. higher than 96% wt, alternatively higher than 97% wt.

In some embodiments, the present disclosure provides a process for the homopolymerization or copolymerization of olefins $CH_2=CHR$, wherein R is hydrogen or a hydrocarbyl radical with 1-12 carbon atoms, carried out in the presence of a catalyst made from or containing the product of the reaction between:
(i) the solid catalyst component;
(ii) an alkylaluminum compound and,
(iii) optionally an electron-donor compound (external donor).

In some embodiments, the polymerization process is carried out in a slurry polymerization using as diluent an inert hydrocarbon solvent, or in bulk polymerization using the liquid monomer as a reaction medium. In some embodiments, the liquid monomer is propylene. In some embodiments, the polymerization process is carried out in gas-phase operating in one or more fluidized or mechanically agitated bed reactors.

In some embodiments, the polymerization is carried out at temperature of from 20 to 120° C., alternatively from 40 to 80° C. In some embodiments, the polymerization is carried out in gas-phase with an operating pressure between 0.5 and 5 MPa, alternatively between 1 and 4 MPa. In some embodiments, the polymerization is carried out in a bulk polymerization with the operating pressure between 1 and 8 MPa, alternatively between 1.5 and 5 MPa.

The following examples are given to further illustrate the disclosure without being intended as limiting it.

Characterizations

Determination of X.I.

2.5 g of polymer and 250 ml of o-xylene were placed in a round-bottomed flask provided with a cooler and a reflux condenser and kept under nitrogen. The mixture was heated to 135° C. and kept under stirring for about 60 minutes. The final solution was cooled to 25° C. under continuous stirring, and the insoluble polymer was then filtered. The filtrate was then evaporated in a nitrogen flow at 140° C. to reach a constant weight. The content of the xylene-soluble fraction is expressed as a percentage of the original 2.5 grams and then, by difference, the X.I. %.

Determination of Donors.

The content of electron donor was determined via gas-chromatography. The solid component was dissolved in acidic water. The solution was extracted with ethyl acetate, an internal standard was added, and a sample of the organic phase was analyzed in a gas chromatograph, to determine the amount of donor present at the starting catalyst compound.

Melt Flow Rate (MFR)

The melt flow rate MIL of the polymer was determined according to ISO 1133 (230° C., 2.16 Kg).

EXAMPLES

Procedure for Preparation of the Spherical Adduct

An initial amount of microspheroidal $MgCl_2 \cdot 2.8C_2H_5OH$ was prepared according to the method disclosed in Example 2 of Patent Cooperation Treaty Publication No. WO98/44009, but operating on a larger scale.

General Procedure for the Polymerization of Propylene

A 4-liter steel autoclave, equipped with a stirrer, pressure gauge, thermometer, catalyst feeding system, monomer feeding lines and thermostatic jacket, was purged with nitrogen flow at 70° C. for one hour. Then, at 30° C. under propylene flow, the autoclave was charged in sequence with 75 mL of anhydrous hexane, 0.76 g of $AlEt_3$, dicyclopentyl dimethoxysilane as external electron donor, thereby providing an Al/Donor molar ratio of 20, and 0.006÷0.010 g of solid catalyst component. The autoclave was closed; subsequently 2.0 NL of hydrogen were added. Then, under stirring, 1.2 kg of liquid propylene was fed. The temperature was raised to 70° C. in five minutes, and the polymerization was carried out at this temperature for two hours. At the end of the polymerization, the non-reacted propylene was removed; the polymer was recovered and dried at 70° C. under vacuum for three hours. Then, the polymer was weighed and fractionated with o-xylene to determine the amount of the xylene insoluble (X.I.) fraction.

General Procedure for the Preparation of the Solid Catalyst Component

Into a 500 $cm^3$ round bottom flask, equipped with mechanical stirrer, cooler and thermometer 250 $cm^3$ of $TiCl_4$ were introduced at room temperature under nitrogen atmosphere. After cooling to 0° C., while stirring, the internal donor listed in Table 1 and 10.0 g of the spherical adduct were sequentially added into the flask. The amount of charged internal donor was to meet a Mg/donor molar ratio of 6. The temperature was raised to 100° C. and maintained for 2 hours. Thereafter, stirring was stopped. The solid product settled. The supernatant liquid was siphoned off at 100° C. After the supernatant was removed, additional fresh TiCl₄ was added to reach the initial liquid volume again. The mixture was then heated at 120° C. and kept at this temperature for 1 hour. Stirring was stopped again. The solid was settled. The supernatant liquid was siphoned off. The solid was washed with anhydrous hexane six times (6×100 cm³) in temperature gradient down to 60° C. and one time (100 cm³) at room temperature. The solid was then dried under vacuum. The solid catalyst components were tested in polymerization of propylene. The results are listed in Table 1.

Example 1-11 and Comparative Examples 1-9

Preparation of Solid Catalyst Component and Polymerization

The procedure for the preparation of the solid catalyst component 1 was carried out using the donor reported in Table 1 as internal donor. The solid catalyst components were tested in polymerization of propylene. The results are listed in Table 1.

TABLE 1

| | Catalyst composition | | | Polymerization | | |
|---|---|---|---|---|---|---|
| | Internal Donor | Ti | | Activity | XI | MIL |
| EX | Structure/Name | % wt | % wt | kg/g | % wt | g/10' |
| C1 | N-cyclohexyl-N-(COOEt)-CH₂COOEt | 5.4 | 2.9 | 21 | 93.9 | 6.7 |
| C2 | HN-CH(COOEt)-CH(Et)(Me) (2° amine, sec-butyl) | 11.1 | 2.9 | 24 | 95.1 | 10.4 |
| C3 | MeN(COOEt)-CH(COOEt)-CH(Et)(Me) | 9.5 | 3.0 | 24 | 95.2 | 6.0 |
| 1 | EtN(COOEt)-CH(COOEt)-CH(Et)(Me) | 13.2 | 3.7 | 53 | 96.8 | 7.7 |
| 2 | iBuN(COOEt)-CH(COOEt)-CH(Et)(Me) | 9.8 | 3.7 | 56 | 96.3 | 7.0 |
| 3 | n-BuN(COOEt)-CH(COOEt)-CH(Et)(Me) | 9.9 | 3.6 | 46 | 96.8 | 6.5 |
| 4 | n-C₆H₁₃N(COOEt)-CH(COOEt)-CH(Et)(Me) | 13.8 | 3.5 | 63 | 97.0 | 7.7 |

TABLE 1-continued

| EX | Internal Donor Structure/Name | % wt | Ti % wt | Activity kg/g | XI % wt | MIL g/10' |
|---|---|---|---|---|---|---|
| C4 | HN(COOEt)–CH(COOEt)–CH$_2$–CH(CH$_3$)$_2$ | 5.9 | 3.7 | 17 | 94.3 | 9.2 |
| 5 | iBu–N(COOEt)–CH(COOEt)–CH$_2$–CH(CH$_3$)$_2$ | 10.9 | 3.8 | 58 | 96.1 | 7.1 |
| C5 | HN(COOEt)–CH(COOEt)–Ph | 7.6 | 2.7 | 15 | 94.4 | 9.7 |
| C6 | iBu–N(COOEt)–CH(COOEt)–Ph | 2.0 | 3.7 | 40 | 90.6 | 6.5 |
| C7 | HN(COOEt)–CH(COOEt)–CH$_2$–Ph | 5.9 | 2.8 | 19 | 92.1 | 8.8 |
| 6 | nBu–N(COOEt)–CH(COOEt)–CH$_2$–Ph | 11.5 | 3.8 | 63 | 96.9 | 2.6 |
| 7 | iBu–N(COOEt)–CH(COOEt)–CH$_2$–Ph | 13.3 | 3.8 | 71 | 97.3 | 2.8 |
| 8 | isopentyl–N(COOEt)–CH(COOEt)–CH$_2$–Ph | 12.9 | 4 | 66 | 96.3 | 3.1 |
| 9 | n-hexyl–N(COOEt)–CH(COOEt)–CH$_2$–Ph | 14.0 | 3.7 | 86 | 97.0 | 3.6 |

TABLE 1-continued

| EX | Catalyst composition Internal Donor Structure/Name | Ti % wt | % wt | Polymerization Activity kg/g | XI % wt | MIL g/10' |
|---|---|---|---|---|---|---|
| 10 | COOEt, N, COOEt, Ph (N-alkyl chain with COOEt and CH2Ph substituents) | 14.3 | 4.0 | 72 | 96.9 | 3.9 |
| 11 | COOEt, N, COOEt, Ph (longer N-alkyl chain) | 13.4 | 3.9 | 74 | 96.8 | 3.9 |
| C8 | N-L-Z-Proline methyl ester | n.d. | 5.4 | 13 | 93.1 | 6.9 |
| C9 | 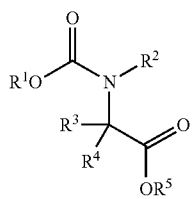 | 7.1 | 3 | 18 | 93.5 | 12.4 | nd: not determined

What is claimed is:

1. A catalyst component for the polymerization of olefins comprising:

Mg, Ti and an electron donor of formula (I)

$$R^1O-C(=O)-N(R^2)-C(R^3)(R^4)-C(=O)-OR^5 \quad (I)$$

where the $R^1$ and $R^5$ groups, equal to or different from each other, are selected from $C_1$-$C_{15}$ hydrocarbon groups, $R^2$ group is selected from $C_2$-$C_{10}$ hydrocarbon groups, wherein $R^3$ is selected from branched $C_3$-$C_{15}$ alkyl or arylalkyl groups and wherein $R^4$ is hydrogen.

2. The catalyst component according to claim 1, wherein $R^1$ is a $C_1$-$C_{10}$ alkyl group or arylalkyl group.

3. The catalyst component according to claim 1, wherein $R^2$ is selected from $C_2$-$C_{10}$ alkyl or $C_7$-$C_{10}$ arylalkyl groups.

4. The catalyst component according to claim 3, wherein $R^2$ is selected from $C_3$-$C_{10}$ alkyl groups or $C_7$-$C_{10}$ arylalkyl groups.

5. The catalyst component according to claim 4, wherein $R^2$ is selected from $C_3$-$C_{10}$ primary alkyl or primary $C_7$-$C_{10}$ arylalkyl groups.

6. The catalyst component according to claim 1, wherein $R^3$ is selected from primary branched $C_4$-$C_{10}$ branched alkyl or arylalkyl groups.

7. The catalyst component according to claim 1, wherein $R^5$ is a $C_1$-$C_{10}$ alkyl group.

8. The catalyst component according to claim 7, wherein $R^5$ is a primary alkyl group.

9. The catalyst component according to claim 1, wherein $R^1$ and $R^5$ are independently a $C_1$-$C_{10}$ alkyl group, $R^2$ is selected from $C_2$-$C_{10}$ alkyl or $C_7$-$C_{10}$ arylalkyl groups, $R^3$ is selected from branched $C_3$-$C_{15}$ alkyl or arylalkyl groups, and $R^4$ hydrogen.

10. A catalyst for the polymerization of olefins comprising:
the product of the reaction between:
(i) the solid catalyst component according to claim 1 and
(ii) an alkylaluminum compound.

11. The catalyst according to claim 10 further comprising an external electron donor compound.

12. A process for the homopolymerization or copolymerization of olefins CH2=CHR, wherein R is hydrogen or a hydrocarbyl radical with 1-12 carbon atoms, carried out in the presence of a catalyst system comprising the product of the reaction between:
i. the solid catalyst component according to claim 1 and
ii. an alkylaluminum compound.

* * * * *